United States Patent
Hashida

(10) Patent No.: US 10,156,943 B2
(45) Date of Patent: Dec. 18, 2018

(54) TOUCH PANEL AND DISPLAY APPARATUS

(71) Applicant: VTS-Touchsensor Co., Ltd., Higashiomi-Shi (JP)

(72) Inventor: Yasunori Hashida, Taito-ku (JP)

(73) Assignee: VTS-Touchsensor Co., Ltd., Higashiomi-shi (JP)

( * ) Notice: Subject to any disclaimer, the term of this patent is extended or adjusted under 35 U.S.C. 154(b) by 60 days.

(21) Appl. No.: 14/809,326

(22) Filed: Jul. 27, 2015

(65) Prior Publication Data

US 2015/0331538 A1    Nov. 19, 2015

Related U.S. Application Data

(63) Continuation of application No. PCT/JP2014/051477, filed on Jan. 24, 2014.

(30) Foreign Application Priority Data

Jan. 25, 2013    (JP) .................................. 2013-012116

(51) Int. Cl.
    *G06F 3/044*    (2006.01)
(52) U.S. Cl.
    CPC .... *G06F 3/044* (2013.01); *G06F 2203/04112* (2013.01)
(58) Field of Classification Search
    CPC .................. G06F 3/044; G06F 2203/04103
    See application file for complete search history.

(56) References Cited

U.S. PATENT DOCUMENTS

| 7,875,814 B2 * | 1/2011 | Chen ....................... G06F 3/046 178/18.01 |
| 8,686,308 B2 * | 4/2014 | Kuriki ..................... G06F 3/044 200/600 |

(Continued)

FOREIGN PATENT DOCUMENTS

| DE | 10 2011 014 748 A1 | 9/2012 |
| JP | 2011-248722 | 12/2011 |

(Continued)

OTHER PUBLICATIONS

International Search Report dated Feb. 25, 2014 in PCT/JP2014/051477, filed Jan. 24, 2014.

(Continued)

*Primary Examiner* — Patrick F Marinelli
(74) *Attorney, Agent, or Firm* — Oblon, McClelland, Maier & Neustadt, L.L.P.

(57) ABSTRACT

A touch panel including a transparent dielectric layer having a front surface and a reverse surface opposite to the front surface, first electrodes each extended in a first direction of a pixel matrix and formed on the front surface of the transparent dielectric layer such that the first electrodes are arranged in a second direction of the pixel matrix which crosses with the first direction, and second electrodes each extended in the second direction and formed on the reverse surface of the transparent dielectric layer such that the second electrodes are arranged in the first direction. Each of the first electrodes includes first main electrode wirings and first sub electrode wirings. Each of the second electrode includes second main electrode wirings and second sub electrode wirings. The first main electrode wirings cross the second main electrode wirings when viewed from the front surface of the dielectric layer.

18 Claims, 7 Drawing Sheets

(56) References Cited

U.S. PATENT DOCUMENTS

| | | | | |
|---|---|---|---|---|
| 8,917,252 B2* | 12/2014 | Kuriki | ............... | G06F 3/044 345/173 |
| 2011/0102361 A1* | 5/2011 | Philipp | ............... | G06F 3/044 345/174 |
| 2011/0102370 A1* | 5/2011 | Kono | ............... | G06F 3/044 345/174 |
| 2011/0290631 A1* | 12/2011 | Kuriki | ............... | G06F 3/044 200/600 |
| 2012/0114919 A1* | 5/2012 | Nakajima | ............... | G06F 3/044 428/203 |
| 2012/0312677 A1* | 12/2012 | Kuriki | ............... | G06F 3/044 200/600 |
| 2013/0242485 A1* | 9/2013 | Ohtani | ............... | G06F 3/041 361/679.01 |
| 2013/0294037 A1* | 11/2013 | Kuriki | ............... | H05K 9/00 361/748 |
| 2014/0231120 A1* | 8/2014 | Nakamura | ............... | B32B 15/14 174/253 |
| 2015/0331538 A1* | 11/2015 | Hashida | ............... | G06F 3/044 345/174 |

FOREIGN PATENT DOCUMENTS

| | | |
|---|---|---|
| JP | 2012-79238 A | 4/2012 |
| JP | 2012-094115 | 5/2012 |
| WO | WO 2009/108758 A2 | 9/2009 |
| WO | WO 2010/013679 A1 | 2/2010 |
| WO | WO 2012/060344 A1 | 5/2012 |
| WO | WO 2012/111819 A9 | 8/2012 |
| WO | WO 2012/115091 A9 | 8/2012 |

OTHER PUBLICATIONS

U.S. Appl. No. 14/808,096, filed Jul. 24, 2015, Hashida.
Extended European Search Report dated Sep. 21, 2016 in Patent Application No. 14743420.3.
Office Action dated Jul. 27, 2017 in European Patent Application No. 14 743 420.3.
Office Action dated Sep. 14, 2017 in Japanese Patent Application No. 2016-071885 (With English Translation).

* cited by examiner

TOUCH PANEL AND DISPLAY APPARATUS

CROSS-REFERENCE TO RELATED APPLICATIONS

The present application is a continuation of International Application No. PCT/JP2014/051477, filed Jan. 24, 2014, which is based upon and claims the benefits of priority to Japanese Application No. 2013-012116, filed Jan. 25, 2013. The entire contents of these applications are incorporated herein by reference.

BACKGROUND OF THE INVENTION

Field of the Invention

A technique according to the present disclosure relates to a touch panel having a plurality of electrode wirings and a display apparatus provided with a touch panel.

Discussion of the Background

In recent years, as an input device of electrical equipment, electrostatic capacitive type touch panels have been widely used. The electrostatic capacitive type touch panel is provided with a plurality of first electrodes extended along a X-direction and a plurality of second electrodes extended along a Y-direction perpendicular to the X-direction. The plurality of first electrode wirings and the plurality of second wirings are stacked with a transparent dielectric layer sandwiched between them. A change in electrostatic capacitance between one first electrode and each of the plurality of second electrodes is detected for every first electrode, thereby detecting the contact location of a finger on the operation surface of the touch panel. As for a material for forming the first electrode and the second electrode, to reduce the resistance of the first electrode and the second electrode, metal such as silver or copper has been employed (e.g., refer to patent literature 1).

Patent Literature 1

Japanese Patent Application Laid-Open Publication No. 2012-79238

SUMMARY OF THE INVENTION

According to one aspect of the present invention, a touch panel includes a transparent dielectric layer having a front surface and a reverse surface opposite to the front surface, first electrodes each extended in a first direction of a pixel matrix and formed on the front surface of the transparent dielectric layer such that the first electrodes are arranged in a second direction of the pixel matrix which crosses the first direction, and second electrodes each extended in the second direction and formed on the reverse surface of the transparent dielectric layer such that the second electrodes are arranged in the first direction. Each of the first electrodes includes first main electrode wirings and first sub electrode wirings. The first main electrode wirings are extended in a direction crossing the first and second directions and have a disconnected region between adjacent first electrodes. The first sub electrode wirings connect the first main electrode wirings. Each of the second electrodes includes second main electrode wirings and second sub electrode wirings. The second main electrode wirings are extended in a direction crossing the first and second directions and have a disconnected region between adjacent second electrodes. The second sub electrode wirings connect the second main electrode wirings. The first and second main electrode wirings are formed such that the first main electrode wirings cross the second main electrode wirings when viewed from the front surface of the dielectric layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Hereinafter, with reference to the drawings, embodiments of the thin film transistor array will now be described. In the respective drawings to be referenced, portions having identical configuration in the respective drawings described below are labeled with the same symbols.

(First Embodiment)

With reference to FIGS. 1 to 6, hereinafter, a touch panel and a display apparatus according to the first embodiment are described. First, with reference to FIG. 1, an overall configuration of the display apparatus is described.

Figure 1:
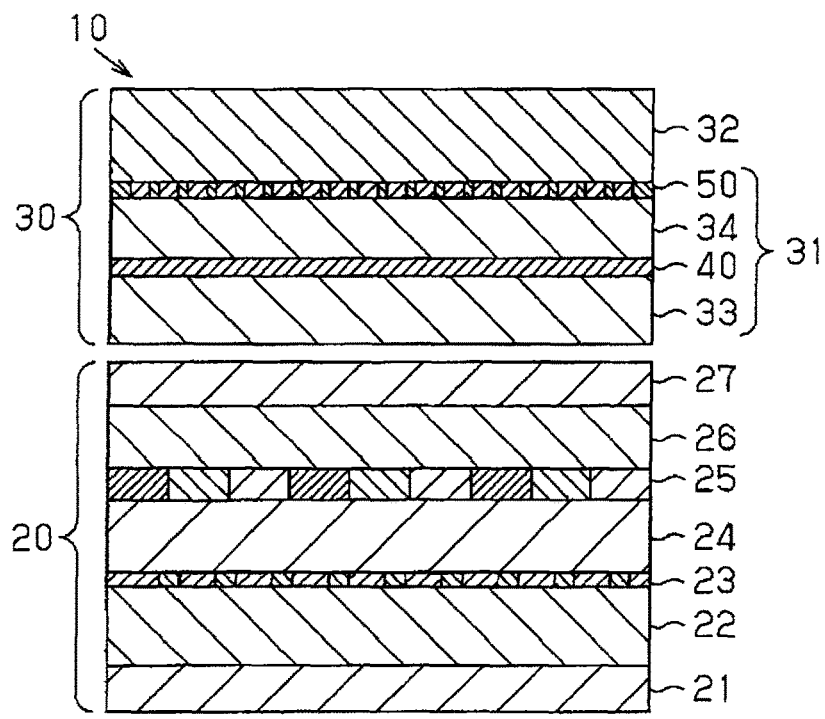
FIG. 1 is a cross-sectional view showing an overall configuration of the display apparatus according to the first and second embodiments of the technique according to the present disclosure.

As shown in FIG. 1, a display apparatus 10 is provided with a display panel 20 and a touch panel 30 stacked on the display panel 20 via an adhesive member. The display panel 20 is a liquid crystal panel including a TFT (thin film transistor) substrate 22 and a color filter substrate 26 disposed between two deflection plates, i.e., a lower deflection plate 21 and an upper deflection plate 27 and a liquid crystal layer 24 sandwiched between the TFT substrate 22 and the color filter substrate 26.

A TFT layer 23 is formed between the TFT substrate 22 and the liquid crystal layer 24. In the TFT layer 23, pixel electrodes that constitute a sub pixel are arranged in a matrix and a TFT which is an active element is provided at every sub pixel. A color filter layer 25 including a common electrode is provided between the color filter substrate 26 and the liquid crystal layer 24. In the color filter 25, a rectangular region that faces the sub pixel is divided by a black matrix. In the respective regions divided by the black matrix, a colored layer that converts white light into either red, green or blue is formed.

The touch panel 30 is stacked on the upper deflection plate 27 which is a deflection plate adjacent to the color filter substrate 26 in the display panel 20. The touch panel 30 is constituted by a sensor layer 31 provided with a plurality of electrodes for detecting a change in electrostatic capacitance and a cover layer 32 stacked on the sensor layer 31, the cover layer 32 being an operation surface which is a surface of the display apparatus 10.

The sensor layer 31 is provided with a plurality of drive electrodes 40 as a second electrode and a plurality of sensing electrodes 50 as a first electrode. The drive electrode 40 is formed on a drive substrate 33 constituted by such as glass and a resin film. For example, the drive electrode 40 is formed by etching metal thin film such as copper film or silver film formed on the surface of the drive substrate 33. The sensing electrode 50 is formed on a sensing substrate 34 constituted by such as glass and a resin film. For example, the sensing electrode 50 is formed by etching metal thin film formed on the front surface of the sensing substrate 34. In other words, in the touch panel 30, the sensing electrode 50 is formed on the front surface of the sensing substrate 34 and the drive electrode 40 is formed on the reverse surface of the sensing substrate 34.

As for the sensor layer 31, the sensing substrate 34 is stacked on the drive substrate 33 via an adhesive member so as to form the sensor layer 31. The sensing substrate 34 serves as a transparent dielectric layer disposed between the drive electrode 40 and the sensing electrode 50. A select signal that charges/discharges an electrical charge in the sensing substrate 34 is applied to the drive electrode 40. A detection signal responding to an amount of electrostatic capacitance between the drive electrode 40 and the sensing electrode 50 is outputted from the sensing electrode 50.

Figure 2:
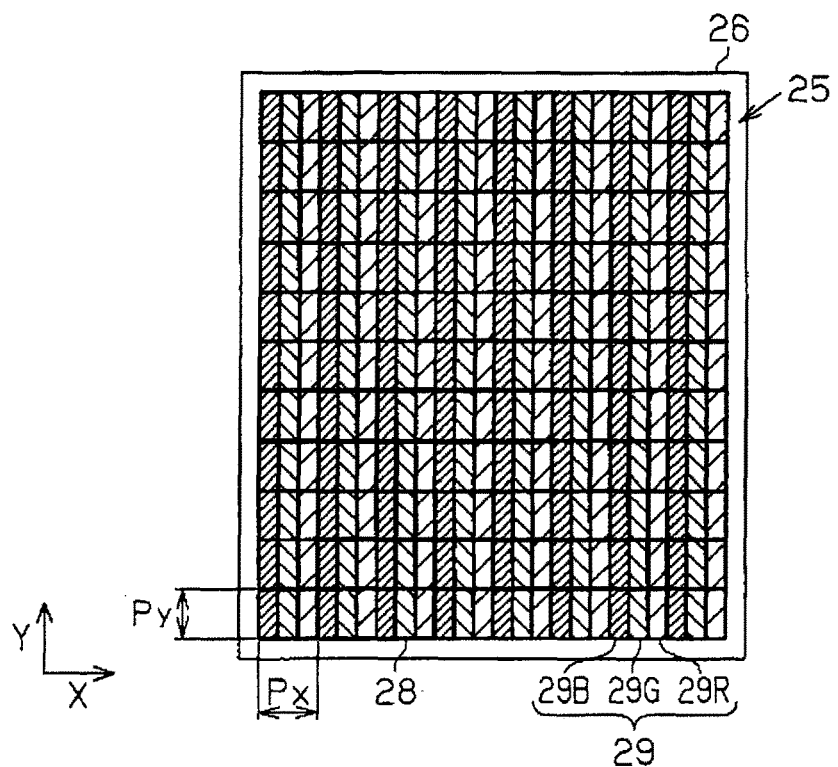
FIG. 2 is a planar view showing a planar structure of a color filter substrate included in the display panel according to the first and second embodiments.

The cover layer 32 is formed of tempered glass or synthetic resin and stacked onto the sensor layer 31 via an adhesive member. With reference to FIG. 2, a planar structure of the color filter layer 25 in the display panel 20 is described. FIG. 2 is a planar view showing a color filter substrate 26 with a color filter layer 25 formed thereon.

As shown in FIG. 2, in the color filter layer 25, a lattice-like pattern in which the vertical axis and the horizontal axis orthogonally cross each other is formed by the black matrix 28. In a rectangular region divided by the black matrix 28, any one of colored layers 29 from among a red colored layer 29R, a green colored layer 29G and a blue colored layer 29B is formed. The colored layers 29 of the same color are arranged extending along one direction. When the colored layers 29 of the same color are set to be arranged extending along the Y-direction, the colored layer 29B for blue color, the colored layer 29G for green color and the red colored layer 29R are arranged repeatedly in this order in the X-direction perpendicular to the Y-direction. Specifically, in the color filter layer 25, the colored layers 29 of the same color are arranged to be extended along the Y-direction to form a stripe shape. On the colored layer 29, a common electrode which is not shown is formed on the entire surface.

Each of the colored layers 29 is assigned to the sub pixel in the TFT layer 23 and three colored layers 29 arranged extending along the X-direction constitute a single pixel and each of the plurality of pixels is arranged extending along the Y-direction so as to form a stripe shape. In the color filter layer 25, a lattice-like pattern constituted by plural rectangles arranged in a matrix divides each of the plural pixels arranged in a stripe shape to be a pixel pattern corresponding to the pixel arrangement. It should be noted that the pixel width Px which is a width of the pixel in the X-direction, and the pixel width Py which is a width of the pixel in the Y-direction are appropriately set depending on the resolution required for the display apparatus.

Figure 3:
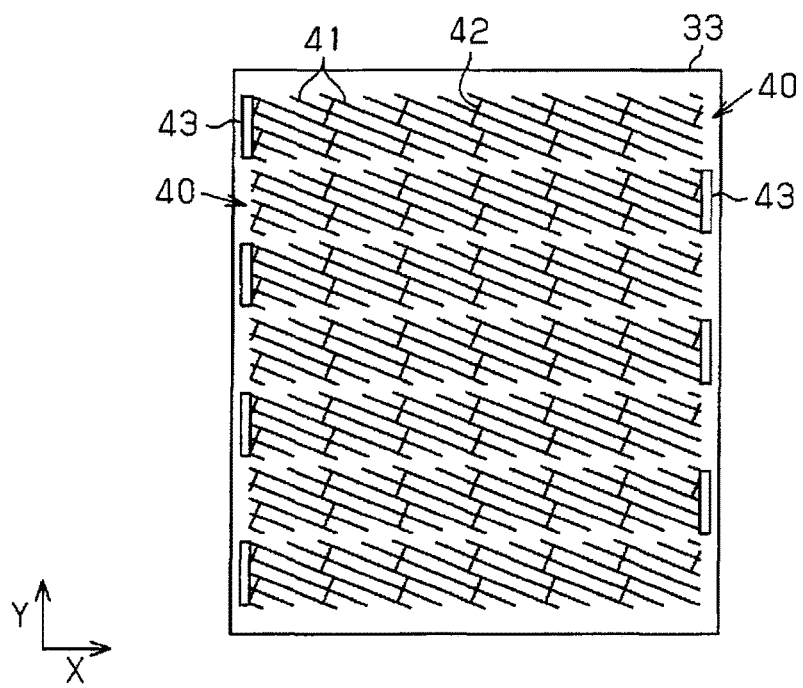
FIG. 3 is a planar view showing a planar structure of a plurality of drive electrodes in the touch panel according to the first embodiment, together with a drive substrate.
Figure 4:
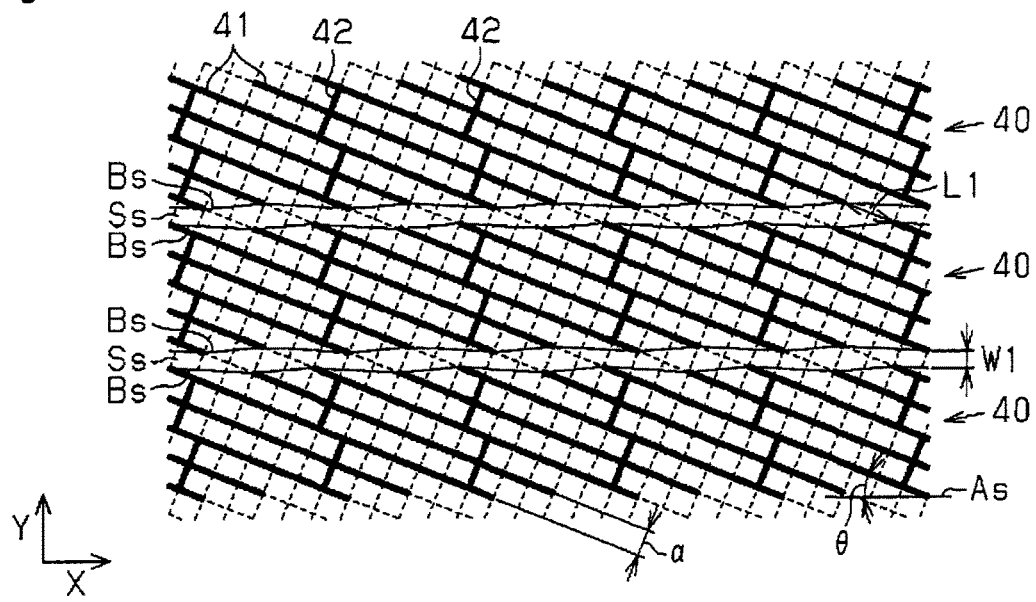
FIG. 4 is an enlarged view of a part of FIG. 3, showing a planar view of a planar structure of the drive electrode in the touch panel according to the first embodiment.
Figure 5:
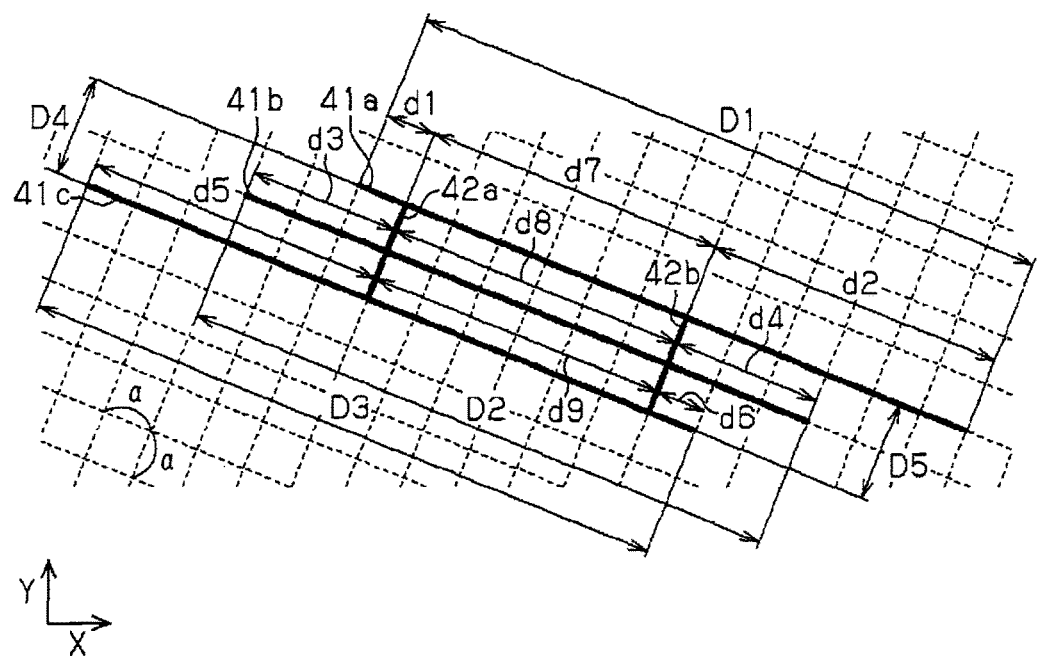
FIG. 5 is a planar view showing a pattern element that constitutes a drive electrode in the touch panel according to the first embodiment.

With reference to FIGS. 3 to 8, a planar structure of the drive electrode 40 and a planar structure of the sensing electrode 50 are described. In FIG. 4 and FIG. 5, for convenience of the explanation, the drive electrode 40 is shown with a grid constituted by a plurality of dotted lines orthogonally crossing each other.

As shown in FIG. 3, each of the plurality of drive electrodes 40 is arranged to be extended along the X-direction perpendicular to the Y-direction with intervals along the Y-direction. Each of the plurality of drive electrodes 40 is connected to a terminal portion 43 at an end portion in the X-direction and each of a plurality of terminal portions is connected to a selection circuit that selects the drive electrode 40.

Each of the plurality of drive electrodes 40 is constituted by two types of electrode wirings extended along mutually different directions, i.e., a plurality of second main electrode wirings 41 and a plurality of second sub electrode wirings 42. In the each of plurality of drive electrodes 40, each of the second main electrode wirings 41 and each of the second sub electrode wirings 42 are connected to be in a meshed shape.

An interval between two mutually adjacent drive electrodes 40 is set as an inter-drive-electrode region Ss. The inter-drive-electrode region is a region where no electrode wirings are formed and electrically isolates two mutually adjacent drive electrodes 40.

As shown in FIG. 4, in each of the plurality of drive electrodes 40, respective second main electrode wirings 41 extend along a direction to cross a first linear line As that extends in the X-direction, and the respective second main electrode wirings 41 are linear lines parallel to each other. An angle θ formed between each of the plurality of second main electrode wirings 41 and the first linear line As is set as an angle other than 90 degrees and a distance between two mutually adjacent second main electrode wirings 41 is set as a lattice constant α.

Respective second sub electrode wirings 42 are mutually parallel linear lines that extend along a direction to cross the first linear line As and the second main electrode wirings 41 and an angle formed between the respective second sub electrode wirings 42 and the second main electrode wirings 41 is set as 90 degrees.

Each of the plurality of second sub electrode wirings 42 is connected to three second main electrode wirings 41 which are mutually adjacent along the X-direction and the three second main electrode wirings 41 which are mutually adjacent along the X-direction are connected by two mutually different second sub electrode wirings 42. In a meshed pattern formed by the drive electrode 40, one second pattern element is formed by three mutually adjacent second main electrode wirings 41 and two mutually adjacent second sub electrode wirings 42 and a plurality of second pattern elements are repeatedly arranged along the X-direction.

In two mutually adjacent drive electrodes 40, two second main electrode wirings 41 face from each other in a direction where the second main electrode wiring 41 extends and a first distance L1 between two second main electrode wirings 41 which face from each other satisfies the relationship, first distance L1=2×lattice constant α. In other words, the second main electrode wiring 41 in each of the plurality of drive electrodes 40 is formed to have a shape in which a line segment of the first distance L1, as a portion corresponding to the inter-drive-electrode region Ss, is cut from one electrode wiring extending along one direction.

Since the minimum unit of length corresponding to respective members in the plurality of second main electrode wirings 31 is set to be the lattice constant α, a line Bs that connects end portions of the second main electrode wirings 41 in one drive electrode 40 is bent at every second main electrode wirings 41 to be in a zigzag shape. A variation of a first width W1 of the inter-drive-electrode region Ss in the Y-direction appears repeatedly at each of second pattern elements arranged in the X-direction.

With reference to FIG. 5, the second pattern element in the drive electrode 40 is described. As shown in FIG. 5, in one second pattern element, a second main electrode wiring 41 located at the center of the X-direction among three second main electrode wirings 41 which are mutually adjacent along the X-direction is set as a center-second main electrode wiring 41b. In FIG. 5, the second main electrode wiring 41 disposed at the right side of the center-second main electrode wiring 41b is set as a tip-end side second main electrode wiring 41a and the second main electrode wiring 41 disposed at the left side of the center-second main electrode wiring 41b is set as a base-end side second main electrode wiring 41c.

Also, in one second pattern element, among two second sub electrode wirings 42 which are mutually adjacent in the X-direction, the second sub electrode wiring 42 disposed at the right side in FIG. 5 is set as a tip-end side second sub electrode wiring 42b and the second sub electrode wiring 42 disposed at left side in FIG. 5 is set as a base-end side second sub electrode wiring 42a.

In both end portions of respective three second main electrode wirings 41 and both end portions of respective two second sub electrode wirings 42, the right end portion in FIG. 5 is set as a tip-end portion and the left end portion in FIG. 5 is set as a base-end portion.

In one second pattern element, the tip-end side second main electrode wiring 41a and the base-end side second main electrode wiring 41c are formed to have a shape whose object-center is a middle point of the center-second main electrode wiring 41b. Moreover, in one second pattern element, the base-end side second sub electrode wiring 42a and the tip-end side second sub electrode wiring 42b are formed to have a shape whose object-center is a middle point of the center-second main electrode wiring 41b as well.

Describing in more detail, the length D2 of the center-second main electrode wiring 41b satisfies the relationship, length D2=12×lattice constant α. The length D1 of the tip-end side second main electrode wiring 41a and the length D3 of the base-end side second main electrode wiring 41c satisfy the relationship, length D1=length D3=13×lattice constant α. The length D4 of the base-end side second sub electrode wiring 42a and the length D5 of the tip-end side second sub electrode wiring 42b satisfy the relationship, length D4=length D5=2×lattice constant α.

In a tip-end portion of the tip-end side second main electrode wiring 41a, a tip-end portion of the tip-end side second sub electrode wiring 42b is connected. In the tip-end portion of the tip-end side second main electrode wiring 41a, the length d2 of a portion protruded from a portion connected to the tip-end side second sub electrode wiring 42b satisfies the relationship, length d2=6×lattice constant α. Also, in a base-end portion of the tip-end side second main electrode wiring 41a, the tip-end portion of the base-end side second sub electrode wiring 42a is connected. In the base-end portion of the tip-end side second main electrode wiring 41a, the length d1 protruded from a portion connected to the base-end side second sub electrode wiring 42a satisfies the relationship, length d1=lattice constant α. In the tip-end side second main electrode wiring 41a, the length d7 between a portion connected to the tip-end side second sub electrode wiring 42b and a portion connected to the base-end side second sub electrode wiring 42a satisfies the relationship, length d7=6×lattice constant α.

The tip-end portion of the center-second main electrode wiring 41b crosses a center portion of the tip-end side second sub electrode wiring 42b. In the tip-end portion of the center-second main electrode wiring 41b, the length d4 of a portion protruded from a portion crossing the tip-end side second sub electrode wiring 42b satisfies the relationship, length d4=3×lattice constant α. Also, the base-end portion of the center-second main electrode wiring 41b crosses a center portion of the base-end side second sub electrode wiring 42a. In the base-end portion of the center-second main electrode wiring 41b, the length d3 of a portion protruded from a portion crossing the base-end side second sub electrode wiring 42a satisfies the relationship, length d3=3×lattice constant α. In the center-second main electrode wiring 41b, the length d8 between a portion crossing the tip-end side second sub electrode wiring 42b and a portion crossing the base-end side second sub electrode wiring 42a satisfies the relationship, length d8=6×lattice factor α.

In the tip-end portion of the base-end side second main electrode wiring 41c, the base-end portion of the tip-end side second sub electrode wiring 42b is connected. In the tip-end portion of the base-end side second main electrode wiring 41c, the length d6 of a portion protruded from a portion connected to the tip-end side second sub electrode wiring 42b satisfies the relationship, length d6=lattice constant α. Also, in the base-end portion of the base-end side second main electrode wiring 41c, the base-end portion of the base-end side second sub electrode wiring 42a is connected. In the base-end portion of the base-end side second main electrode wiring 41c, the length d5 of a portion protruded from a portion connected to the base-end side second sub electrode wiring 42a satisfies the relationship, length d5=6×lattice constant α. In the base-end side second main electrode wiring 41c, the length d9 between a portion connected to the tip-end side second sub electrode wiring 42b and a portion connected to the base-end side second sub electrode wiring 42a satisfies the relationship, length d9=6×lattice constant α.

Figure 6:
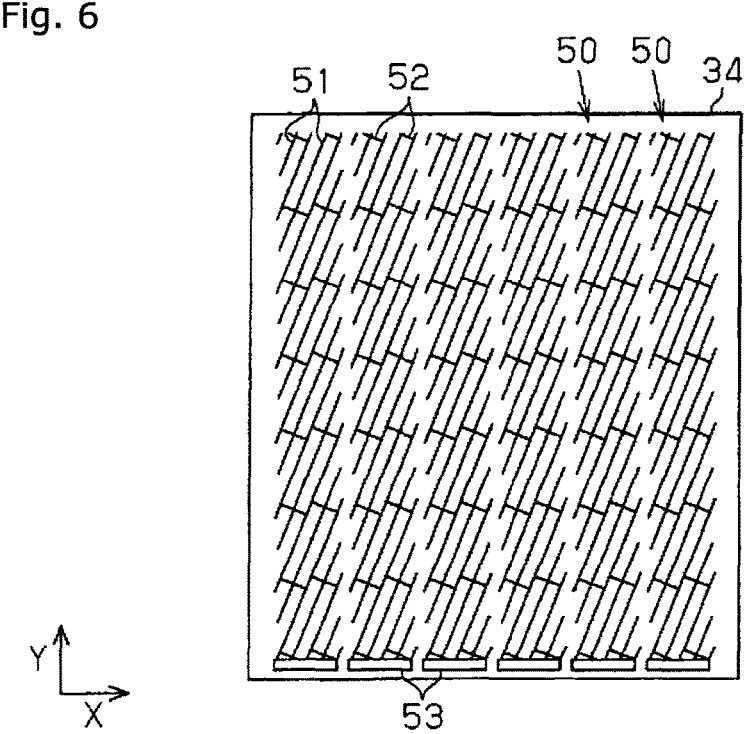
FIG. 6 is a planar view showing a planar structure of a plurality of sensing electrodes in the touch panel according to the first embodiment, together with a sensing substrate.
Figure 7:
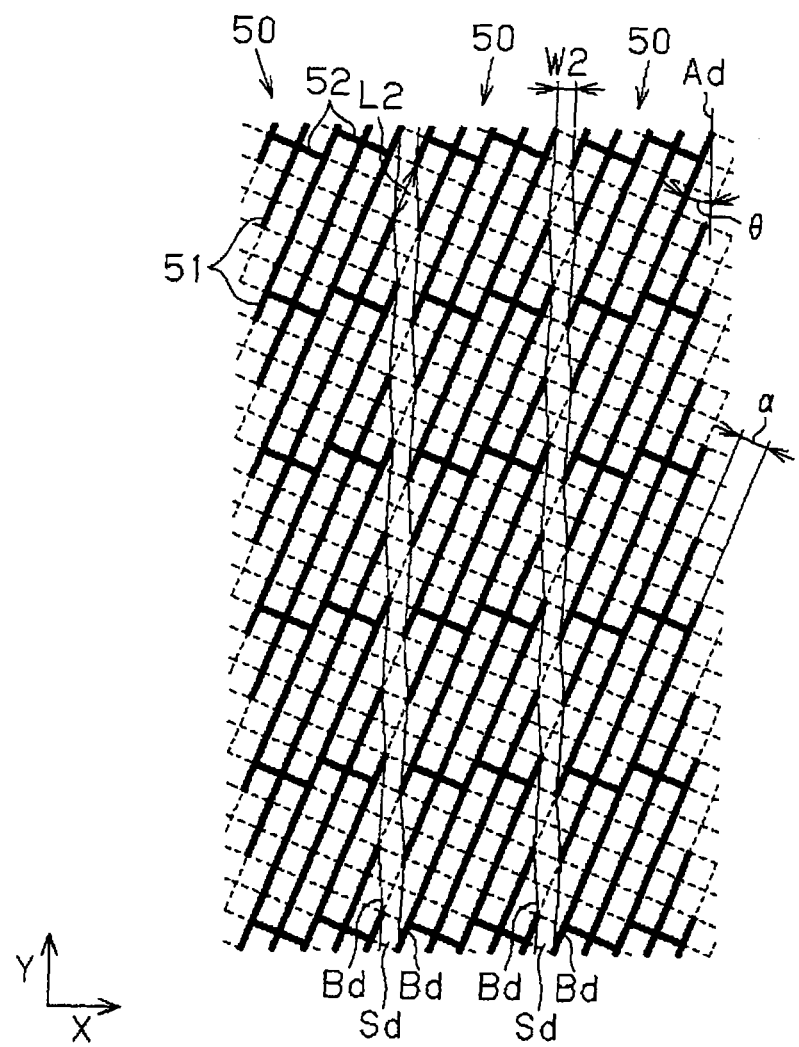
FIG. 7 is an enlarged view of a part of FIG. 6 showing a planar view of a planar structure of the sensing electrode in the touch panel according to the first embodiment.
Figure 8:
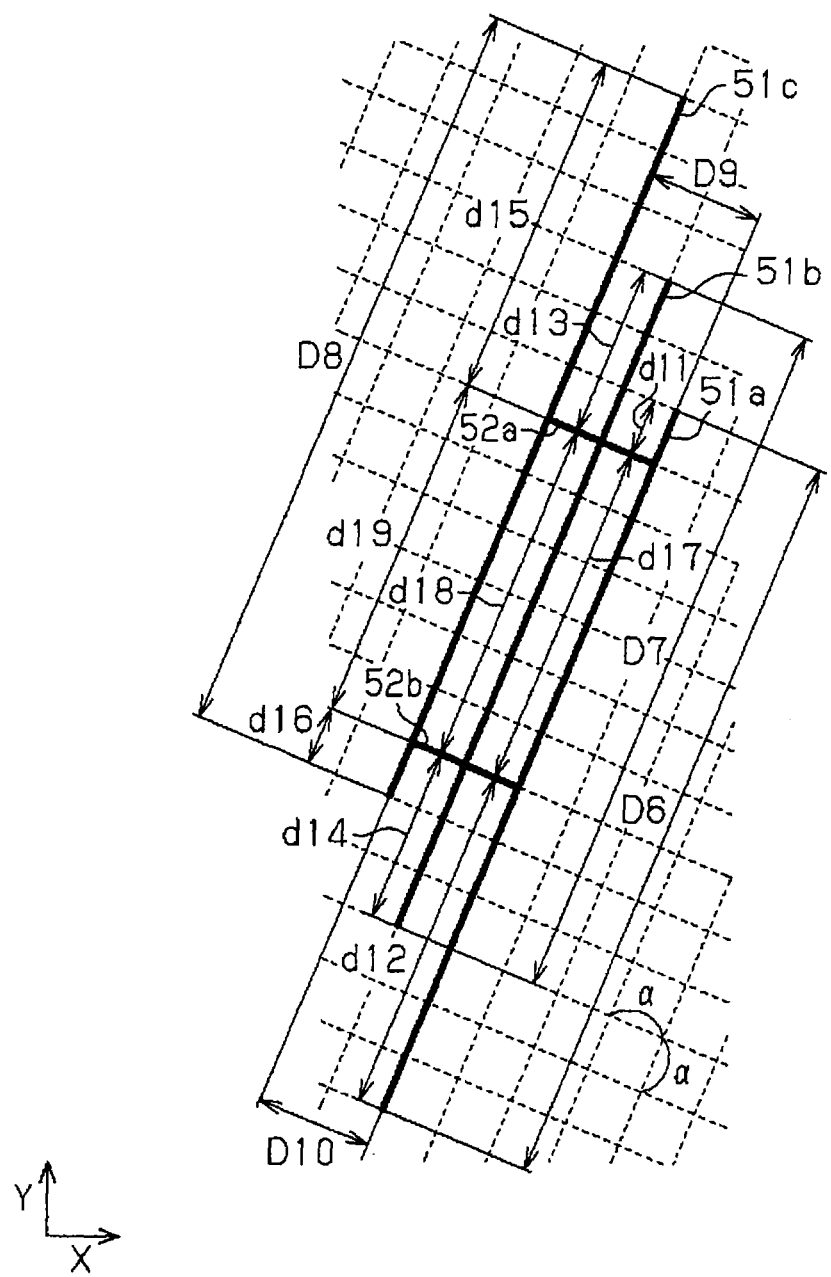
FIG. 8 is a planar view showing a pattern element that constitutes a sensing electrode in the touch panel according to the first embodiment.

With reference to FIGS. 6 to 8, a planar structure of the sensing electrode 50 is described. In FIG. 7 and FIG. 8, for convenience of the explanation, the sensing electrode 50 is shown as a grid constituted by a plurality of dotted lines orthogonally crossing each other.

As shown in FIG. 6, for each of the plurality of sensing electrodes 50, compared to the drive electrode 40, the direction in which the electrode is extended and the direction in which the electrodes are arranged are different from those of the drive electrode 40. In other words, each of the plurality of sensing electrodes 50 extends along the Y-direction and arranged repeatedly along the X-direction perpendicular to the Y-direction at intervals. Each of the sensing electrodes 50 is connected to a terminal portion 53 at one end thereof in the Y-direction. Each of a plurality of terminal portions 53 is connected to a detection circuit that detects a change in electrostatic capacitance.

Each of the plurality of sensing electrodes 50 is constituted by two types of electrode wirings extended along mutually different directions, i.e., a plurality of first main electrode wirings 51 and a plurality of first sub electrode wirings 52. In the each of plurality of sensing electrodes 50, each of the first main electrode wirings 51 and each of the first sub electrode wirings 52 are connected to be in a meshed shape.

An interval between two mutually adjacent sensing electrodes 50 is an inter-sensing-electrode region Sd. The inter-sensing-electrode region is a region where no electrode wirings is formed and electrically isolates two mutually adjacent sensing electrodes 50.

As shown in FIG. 7, in each of the plurality of sensing electrodes 50, respective first main electrode wirings 51 extend along a direction to cross a second linear line Ad that extends in the Y-direction and the respective first main electrode wirings 51 are linear lines parallel to each other. An angle θ is formed between each of the plurality of first main electrode wirings 51 and the second linear line Ad and a distance between two mutually adjacent first main electrode wirings 51 is set as the above-described lattice constant α.

Respective first sub electrode wirings 52 are mutually parallel linear lines that extend along a direction to cross the second linear line Ad and the first main electrode wirings 51 and an angle formed between the respective first sub electrode wirings 52 and the first main electrode wirings 51 is 90 degrees. When viewing from the surface of the display apparatus 10, the first main electrode wiring 51 of the sensing electrode 50 extends in the same direction as the second sub electrode wiring 42 of the drive electrode 40, and the second sub electrode wiring 52 of the sensing electrode 50 extends in the same direction as the second main electrode wiring 41 of the drive electrode 40.

Each of the plurality of first sub electrode wirings 52 is connected to three first main electrode wirings 51 which are mutually adjacent along the Y-direction and the three first main electrode wirings 51 which are mutually adjacent along the Y-direction are connected by two mutually different first sub electrode wirings 52.

In a meshed pattern formed by the sensing electrode 50, one first pattern element is formed by three mutually adjacent first main electrode wirings 51 and two mutually adjacent first sub electrode wirings 52 and a plurality of first pattern elements are repeatedly arranged along the X-direction. The first pattern element in the sensing electrode 50 is a pattern in which the second pattern element in the drive electrode 40 is rotated by 90 degrees in the XY plane.

In two mutually adjacent sensing electrodes 50, two first main electrode wirings 51 face each other in a direction where the first main electrode wiring 51 extends and a second distance L2 between two first main electrode wirings 51 which face from each other satisfies the relationship, second distance L2=2×lattice constant α. In other words, the first main electrode wiring 51 in each of the plurality of sensing electrodes 50 is formed to have a shape in which a line segment of the second distance L2 as a portion corresponding to the inter-sensing-electrode region Sd, is cut from one electrode wiring extending along one direction.

Since the minimum unit of length corresponding to respective members in the plurality of first main electrode wirings 51 is set to be the lattice constant α, a line Bd that connects end portions of the first main electrode wirings 51 in one sensing electrode wiring 50 is bent at every first main electrode wirings 51 to be in a zigzag shape. A variation of a second width W2 of the inter-sensing-electrode region Sd in the X-direction appears repeatedly at each of the first pattern elements arranged in the Y-direction.

With reference to FIG. 8, the first pattern element in the sensing electrode 50 is described. As shown in FIG. 8, in one first pattern element, a first main electrode wiring 51 located at the center of the Y-direction among three first main electrode wirings 51 which are mutually adjacent along the Y-direction is set as a center-first main electrode wiring 51b. In FIG. 8, the first main electrode wiring 51 disposed at the lower side of the center-first main electrode wiring 51b is set as a base-end side first main electrode wiring 51a and the first main electrode wiring 51 disposed at the upper side of the center-first main electrode wiring 51b is set as a tip-end side first main electrode wiring 51c.

Also, in one first pattern element, among two first sub electrode wirings 52 which are mutually adjacent in the Y-direction, the first sub electrode wiring 52 disposed at the lower side in FIG. 8 is set as a base-end side first sub electrode wiring 52b and the first sub electrode wiring 52 disposed at the upper side in FIG. 8 is set as a tip-end side first sub electrode wiring 52a.

In both end portions of respective three first main electrode wirings 51 and both end portions of respective two first sub electrode wirings 52, the lower end portion in FIG. 8 is set as a base-end portion and the upper end portion in FIG. 8 is set as a tip-end portion.

In one first pattern element, the base-end side first main electrode wiring 51a and the tip-end side first main electrode wiring 51c are formed to have a shape whose object-center is a middle point of the center-first main electrode wiring 51b. Moreover, in one first pattern element, the tip-end side first sub electrode wiring 52a and the base-end side first sub electrode wiring 52b are formed to have a shape whose object-center is a middle point of the center-first main electrode wiring 51b as well.

Describing in more detail, the length D7 of the center-first main electrode wiring 51b satisfies the relationship, length D7=12×lattice constant α. The length D6 of the base-end side first main electrode wiring 51a and the length D8 of the tip-end side first main electrode wiring 51c satisfy the relationship, length D6=length D8=13×lattice constant α. The length D9 of the tip-end side first sub electrode wiring 52a and the length D10 of the base-end side first sub electrode wiring 52b satisfy the relationship, length D9=length D10=2×lattice constant α respectively.

In a tip-end portion of the base-end side first main electrode wiring 51a, a base-end portion of the tip-end side first sub electrode wiring 52a is connected. In the tip-end portion of the base-end side first main electrode wiring 51a, the length d11 of a portion protruded from a portion connected to the tip-end side first sub electrode wiring 52a satisfies the relationship, length d11=lattice constant α. Also, in a base-end portion of the base-end side first main electrode wiring 51a, the base-end portion of the base-end side first sub electrode wiring 52b is connected. In the base-end portion of the base-end side first main electrode wiring 51a, the length d12 protruded from a portion connected to the base-end side first sub electrode wiring 52b satisfies the relationship, length d12=6×lattice constant α. In the base-end side first main electrode wiring 51a, the length d17 between a portion connected to the tip-end side first sub electrode wiring 52a and a portion connected to the base-end side first sub electrode wiring 52b satisfies the relationship, length d17=6×lattice constant α.

The tip-end portion of the center-first main electrode wiring 51b crosses a center portion of the tip-end side first sub electrode wiring 52a. In the tip-end portion of the center-first main electrode wiring 51b, the length d13 of a portion protruded from a portion crossing the tip-end side first sub electrode wiring 52a satisfies the relationship, length d13=3×lattice constant α. Also, the base-end portion of the center-first main electrode wiring 51b crosses a center portion of the base-end side first sub electrode wiring 52b. In the base-end portion of the center-first main electrode wiring 51b, the length d14 of a portion protruded from a portion crossing the base-end side first sub electrode wiring 52b satisfies the relationship, length d14=3×lattice constant α. In the center-first main electrode wiring 51b, the length d18 between a portion crossing the tip-end side first sub electrode wiring 52a and a portion crossing the base-end side first sub electrode wiring 52b satisfies the relationship, length d18=6×lattice factor α.

In the tip-end portion of the tip-end side first main electrode wiring 51c, the tip-end portion of the tip-end side first sub electrode wiring 52a is connected. In the tip-end portion of the tip-end side first main electrode wiring 51c, the length d15 of a portion protruded from a portion connected to the tip-end side first sub electrode wiring 52a satisfies the relationship, length d15=6×lattice constant α. Also, in the base-end portion of the tip-end side first main electrode wiring 51c, the tip-end portion of the base-end side first sub electrode wiring 52b is connected. In the base-end portion of the tip-end side first main electrode wiring 51c, the length d16 of a portion protruded from a portion connected to the base-end side first sub electrode wiring 52b satisfies the relationship, length d16=lattice constant α. In the tip-end side first main electrode wiring 51c, the length d19 between a portion connected to the tip-end side first sub electrode wiring 52a and a portion connected to the base-end side first sub electrode wiring 52b satisfies the relationship, length d19=6×lattice constant α.

Figure 9:
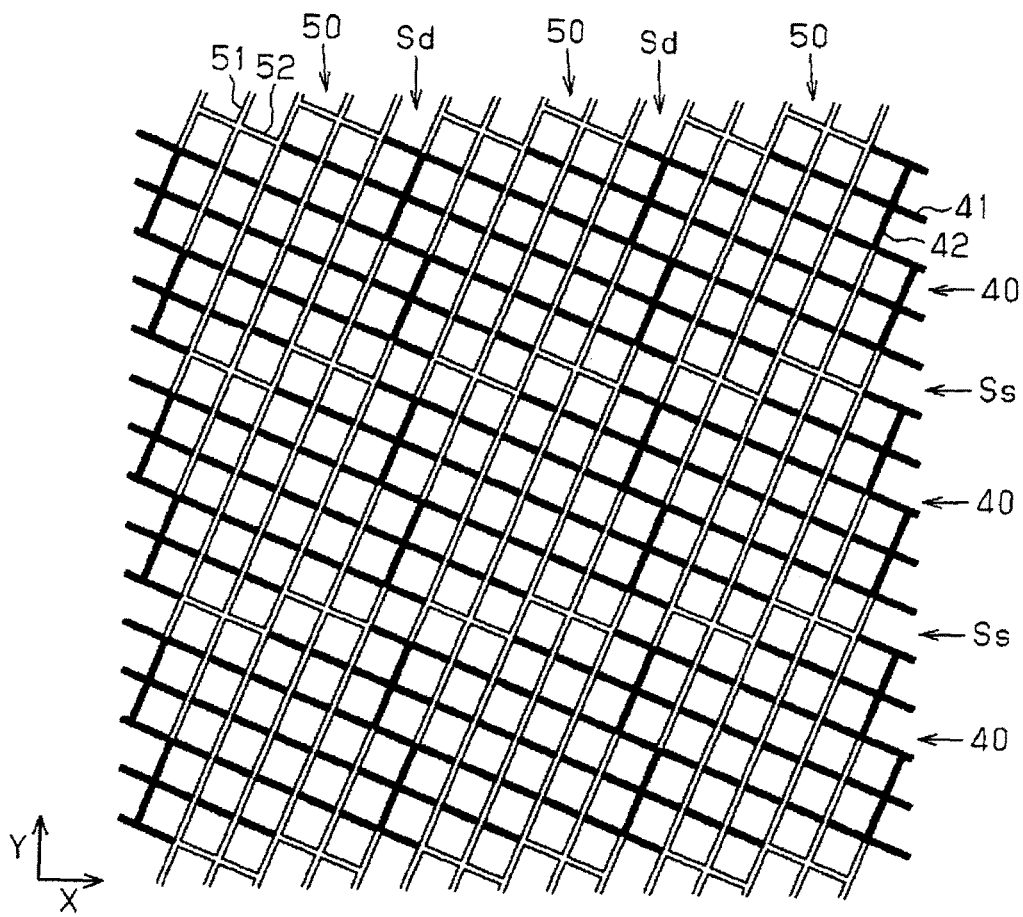
FIG. 9 is a diagram viewed from a lamination direction, showing the drive electrode and the sensing electrode in the touch panel according to the first embodiment, and showing an enlarged view of a pattern formed by the drive electrode and the sensing electrode.

With reference to FIG. 9, an electrode pattern formed by the drive electrode 40 and the sensing electrode 50 is described. In FIG. 9, for convenience of explanation, viewing from the front surface of the sensing substrate 34 which is a transparent dielectric layer, that is, viewing from the surface of the display apparatus 10, each of the plurality of sensing electrodes 50 arranged above the sensing substrate 34 are shown as white hollow lines and each of the plurality of drive electrodes 40 arranged below the sensing substrate 34 are shown as solid lines.

As shown in FIG. 9, when viewing from the surface of the display apparatus 10, the second main electrode wirings 41 and the first sub electrode wiring 52 are arranged on one linear line and the second sub electrode wiring 42 and the first main electrode wiring 51 are arranged on one linear line as well.

When viewing from the surface of the display apparatus 10, two mutually adjacent second main electrode wiring 41 and two mutually adjacent first main electrode wirings 51 define one square as a lattice unit. In the lattice unit defined by the second main electrode wiring 41 and the first main electrode wiring 51, a length corresponding to each side is a lattice factor α.

As described, the second main electrode wiring 41 that constitutes an edge of the lattice unit and the first linear line As that extends along the X-direction crosses with each other at an angle θ. The first main electrode wiring 51 that constitutes an edge of the lattice unit and the second linear line Ad that extends along the Y-direction crosses with each other at an angle θ as well. Hence, each of a plurality of lattice units which are divided by the second main electrode wirings 41 and the first main electrode wirings 51 has an inclination of angle θ in the XY plane with respect to a square divided by two first linear lines As and two second linear lines Ad.

When viewing from the surface of the display apparatus 10, the second sub electrode wiring 42 is arranged in the inter-sensing-electrode region Sd, and an interval between two first main electrode wirings 51 arranged along a direction where the first main electrode 51 extends is complemented by this second sub electrode wirings 42. Viewing from the surface of the display apparatus, an image having a linear line shape is formed by two first main electrode wirings 51 arranged along a direction where the first main electrode wiring 51 extends and the second sub electrode wiring 42 that supplements the interval between these two first electrode wirings 51.

When viewing from the surface of the display apparatus 10, the first sub electrode wiring 52 is arranged in the inter-drive-electrode region Ss and an interval between two second main electrode wirings 41 arranged along a direction where the second main electrode 41 extends is complemented by this first sub electrode wirings 52. When viewing from the surface of the display apparatus, an image having a linear line shape is formed by two first main electrode wirings 51 arranged along a direction where the first main electrode wiring 51 extends and the second sub electrode wiring 42 that complements the interval between these two first electrode wirings 51.

When viewing from the surface of the display apparatus 10, in an image composed of an image of the drive electrode 40 and an image of the sensing electrode 50 which are overlapped with each other, a plurality of lattice units are successively formed along a direction forming an angle θ with respect to the first linear line As and a plurality of lattice units are successively formed along a direction forming an angle θ with respect to the second linear line Ad.

When viewing from the surface of the display apparatus 10, a region where the inter-drive-electrode region Ss and the inter-sensing-electrode region Sd are overlapped, that is, a region where both the drive electrode wiring 40 and the sensing electrode wiring 50 cannot be visually recognized, has a size smaller than a lattice unit. Therefore, as an overlapped image in which an image of the drive electrode 40 and an image of the sensing electrode 50 are overlapped each other, a lattice-like electrode pattern having no gaps is formed.

Effects of the touch panel 30 and the display apparatus 10 are described. In the touch panel 30, a lattice-like pattern composed of the above-described lattice units repeatedly arranged is formed as an overlapped image in which an image of the drive electrode 40 and an image of the sensing electrode 50 are overlapped with each other. In this case, each of the plurality of lattice units which are divided by the second main electrode wiring 41 and the first main electrode wiring 51 has an inclination of angle θ in the XY plane with respect to a square divided by two first linear lines As and two second linear line Ad. Also, the plural lattice units are successively formed in a direction crossed with the X-direction where the drive electrode 40 extends and successively appears in a direction crossed with the Y-direction where the sensing electrode 50 extends.

Here, in the display apparatus 10, the X-direction which is a direction where the drive electrode 40 extends and the Y-direction which is a direction where the sensing electrode 50 extends are defined as an arrangement direction where the pixels are arranged in a matrix. Hence, when viewing from the surface of the display apparatus, the image having a linear line shape that divides each of the plurality of lattice units has an inclination other than 90 degrees and crosses obliquely with respect to the image having linear line shape that divides each of the plurality of pixels. As a result, compared to a conventional configuration in which a linear line that constitutes an electrode pattern and a linear line that constitutes a pixel pattern are disposed parallel to each other, a shift occurring between the linear line that constitutes an electrode pattern and the linear line that constitutes a pixel pattern becomes indistinct. In a case where the display panel 20 and the touch panel 30 are overlapped, the occurrence of interference fringes can be avoided. Moreover, degradation of the image in the display apparatus 10 can be avoided. Furthermore, since the display apparatus 10 does not need a separate structure such as a film for suppressing interference fringes, the manufacturing steps of the display apparatus 10 can be simplified.

When viewing from the surface of the display apparatus 10, in the inter-drive-electrode region Ss, an interval between two second main electrode wirings 41 arranged in a direction where the second main electrode wiring 41 extends is connected by an image of the first sub electrode wiring 52. In the inter-sensing-electrode region Sd, an interval between two first main electrode wirings 51 arranged in a direction where the first main electrode wiring 51 extends is connected by an image of the second sub electrode wiring 42. Accordingly, when viewing from the surface of the display apparatus, it is avoided that different images are visually recognized between the inter-drive-electrode region Ss and the drive electrode 40 or between the inter-sensing-electrode region Sd and the sensing electrode 50. As a result, homogeneity of the electrode pattern is enhanced and a degradation of image in the display apparatus 10 is avoided. In other words, the drive electrode 40 and the sensing electrode 50 are complementarily constituted and an electrode pattern is formed in a lattice like pattern to have no gaps. Therefore, when viewing from the surface of the display apparatus 10, recognition of different images can be avoided, among a region where one electrode is arranged, a region where two electrodes are overlapped and a region where no electrodes are formed.

In the electrode pattern, the lattice unit as a square is successively arranged along a direction where the second main electrode wiring 41 extends and a direction where the first main electrode wiring 51 extends. Hence, compared to a case where an image including a missing part of the lattice is visually recognized as an electrode pattern, homogeneity of the image to be visually recognized can be enhanced. As a result, when viewing from the surface of the display apparatus 10, an occurrence of nonuniformity on an overlapped image composed of an image of the drive electrode 40 and an image of the sensing electrode 50 which are overlapped with each other can be avoided. Further, compared to a case where the electrode pattern is formed from a quadrangle which is not a rectangle, e.g., the electrode pattern includes a polygonal line or a curved line, an occurrence of nonuniformity on the electrode pattern can be avoided. Even in this case, degradation of the image in the display apparatus 10 can be avoided.

EXAMPLE

A touch panel of the example was produced under the following electrode conditions applied to the dimension of the electrode pattern. Also, a display panel of the example was produced under the following pixel conditions applied to the dimension of the display panel. The touch panel and the display panel were laminated so as to produce a display apparatus of the example. In the display apparatus of the example, occurrence of interference fringes was evaluated by a visual inspection as a sensory evaluation. As a result, it was confirmed that occurrence of interference fringes was appropriately avoided within a range in which the following electrode condition and the following pixel condition were satisfied.

<Electrode Condition>
Lattice constant $\alpha$: from 0.3 mm to 0.32 mm
Angle $\theta$: from 30 degrees to 40 degrees
<Pixel Condition>
Pixel width Px, Pixel width Py: 84 μm, 252 μm
As described above, according to the first embodiment, the following effects can be obtained.

(1) Viewing from the surface of the display apparatus 10, since the linear line that divides the pixel of the display panel 20 and the linear line that constitutes the electrode pattern of the touch panel cross obliquely, occurrence of interference fringes can be avoided.

(2) An interval between two second main electrode wiring 41 arranged along a direction where the second main electrode wiring 41 extends is supplemented by an image of one first sub electrode wiring 52. Also, an interval between two first main electrode wiring 51 arranged along a direction where the first main electrode wiring 51 extends is supplemented by an image of one second sub electrode wiring 42. Therefore, recognition of different images between an inter-drive-electrode region Ss and a drive electrode 40 or between an inter-sensing-electrode region Sd and a sensing electrode 50 can be avoided.

(3) When viewing from the surface of the display apparatus 10, since an electrode pattern is a lattice like pattern with no gaps, compared to an image where the lattice has missing parts, occurrence of nonuniformity on the electrode pattern can be avoided.

(4) The electrode pattern is a lattice-like shape composed of repeated rectangles, and compared to a case where the lattice is constituted by quadrangles other than rectangles, the occurrence of undulation of the electrode pattern can be avoided.

(Second Embodiment)

Figure 10:
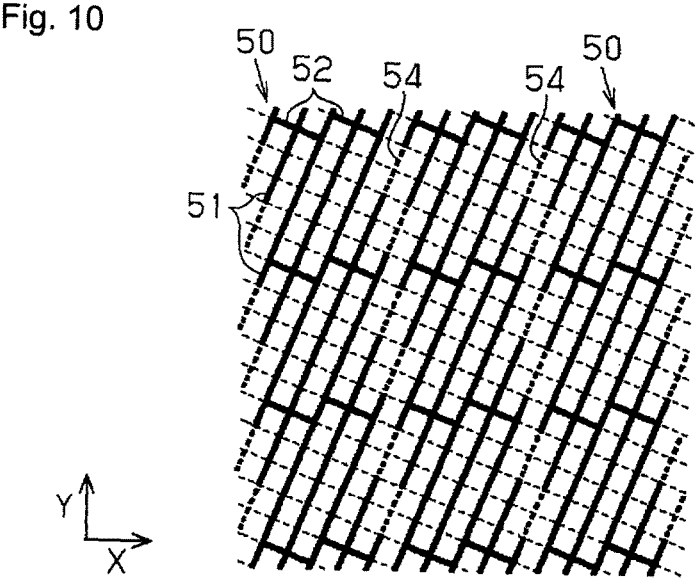
FIG. 10 is an enlarged planar view in which part of the planar structure of the plurality of sensing electrodes formed on the sensing substrate in the touch panel according to the second embodiment is partly enlarged.

With reference to FIG. 10, regarding a touch panel and a display apparatus according to the second embodiment, differences from the first embodiment will mainly be described. In the second embodiment, since the shape of the electrode wiring formed on the sensing substrate differs from that of the first embodiment, in the following, the planar structure of the electrode wiring formed on the sensing substrate will be mainly described and similar configurations to the first embodiment are labeled with the same reference numbers and the explanation thereof is omitted.

As shown in FIG. 10, in an inter-sensing-electrode region Sd formed on the sensing substrate, a plurality of auxiliary electrodes 54 are formed. Each of the auxiliary electrodes 54 is arranged at an interval between two first main electrode wirings 51 which are arranged along a direction where the first main electrode wiring 51 extends. Each of the auxiliary electrodes 54 discontinuously connects two first main electrode wirings 51. The two first main electrode wirings 51 arranged along a direction where the first main electrode wiring 51 extends are electrically isolated from each other similar to that of the first embodiment.

Accordingly, when viewing from the surface of the display apparatus 10, a second sub electrode wiring 42 is arranged at an interval between two first main electrode wirings 51 arranged along a direction where the first main electrode wiring 51 extends. Each of the plurality of auxiliary electrode wirings 54 is arranged at a portion that overlaps the second sub electrode wiring 42.

Here, an image of the second sub electrode wiring 42 to be visually recognized from the surface of the display apparatus 10 is formed by light transmitted through the sensing substrate. Hence, the lower the transmittance of the sensing substrate, the less distinct the image of the second sub electrode wiring 42. In this respect, according to the configuration in which the above-described auxiliary electrode wiring 54 is formed, since the image of the second sub electrode wiring 42 and the auxiliary electrode wiring 54 are overlapped with each other, the auxiliary electrode wiring 54 is visually recognized as a part of image that connects two first main electrode wirings 51 which are interrupted. Therefore, when viewing from the surface of the display apparatus 10, occurrence of nonuniformity on the image formed by the drive electrode 40 and the sensing electrode 50 can be further avoided. Moreover, even in a case where positions are shifted between the drive electrode 40 and the sensing electrode 50, the lattice-like electrode pattern is corrected by the auxiliary electrode wiring 54 whereby appearance of the lattice-like pattern as a broken pattern is avoided. As a result, degradation of the image in the display apparatus 10 can be avoided.

As described, according to the second embodiment, the following effects in addition to the above-described effects (1) to (4) can be obtained.

(5) The interval between two first main electrode wirings 51 arranged along a direction where the first main electrode wiring 51 extends is discontinuously connected by the auxiliary electrode wiring 54. Hence, occurrence of nonuniformity of the image of the electrode pattern in the inter-sensing-electrode region Sd can be avoided.

(Modification)

The above-described embodiments can be implemented, with modified as follows.

The electrode pattern is not limited to a pattern constituted by a square shape arranged in a matrix, however, the electrode pattern can be constituted by a rectangular shape or diamond shape instead of the square shape. For example, the length of the main electrode wirings 41 and 51 in the pattern element, length of the sub electrode wirings 42 and 52 and these arrangement of the electrode wirings may differ from the above-described arrangement or may differ at every pattern element. Further, the angle formed between the main electrode wirings 41 and 51, and the sub electrode wirings 42 and 52 may be angles other than 90 degrees or the lattice constant α and the angle θ may be different between the drive electrode 40 and the sensing electrode 50. In the drive electrode 40 or the sensing electrode 50, the lattice constant α and the angle θ may not be constant.

The electrode pattern may be a shape having missing part of lattice. For example, an area of the region where the inter-drive-electrode region Ss and the inter-sensing-electrode region Sd are overlapped may be larger than that of the lattice unit. Also, when viewing from the surface of the display apparatus 10, the second sub electrode wiring 42 of the drive electrode 40 may optionally not be arranged at a gap portion of the first main electrode 51 in the adjacent sensing electrodes 50, but may be arranged at a portion other than the gap portion of the first main electrode wiring 51. Further, when viewing from the front surface of the sensing substrate 34, the first sub electrode wiring 52 of the sensing electrode 50 may optionally not be arranged at a gap portion of the second main electrode 41 in the adjacent drive electrodes 40, but may be arranged at a portion other than the gap portion of the second main electrode wiring 41.

The line Bs that connects end portions of the second main electrode wirings 41 in the drive electrode 40 may be a linear line and the first width W1 in the Y-direction of the inter-drive-electrode region Ss may be constant. Similarly, the line Bd that connects end portions of the first main electrode wirings 51 in the sensing electrode 50 may be a linear line and the second width W2 in the X-direction of the inter-sensing-electrode region Sd may be constant.

According to the above-described modification, the main electrode wirings 41 and 51 may have a configuration in which the main electrode wirings 41 and 51 extend along a direction that crosses a direction where the drive electrode 40 extends and a direction that crosses a direction where the sensing electrode 50 extends. According to this configuration, when viewing from the surface of the display apparatus 10, it is appeared a portion in which a linear line that constitutes the electrode pattern and a linear line that constitutes a pixel pattern obliquely cross. Hence, interference fringes can be avoided compared to a case where a vertical line of the electrode pattern and a vertical line of the pixel pattern are parallel to each other and a horizontal line of the electrode pattern and a horizontal line of the pixel pattern are parallel to each other.

In the second embodiment, the auxiliary electrode wiring 54 may be arranged at a portion overlapping the second main electrode wiring 41 when viewing from the surface of the display apparatus 10.

In the second embodiment, also, on the drive substrate 33, an auxiliary electrode wiring that discontinuously connects two second main electrode wirings 41 may be formed at an interval between two second main electrode wirings 41 arranged along a direction where the second main electrode wiring 41 of the drive electrode 40 extends. Further, an auxiliary electrode wiring that discontinuously connects two first main electrode wirings 51 may be omitted and only an auxiliary electrode wiring that discontinuously connects two second main electrode wirings 41 may be formed.

Figure 11:
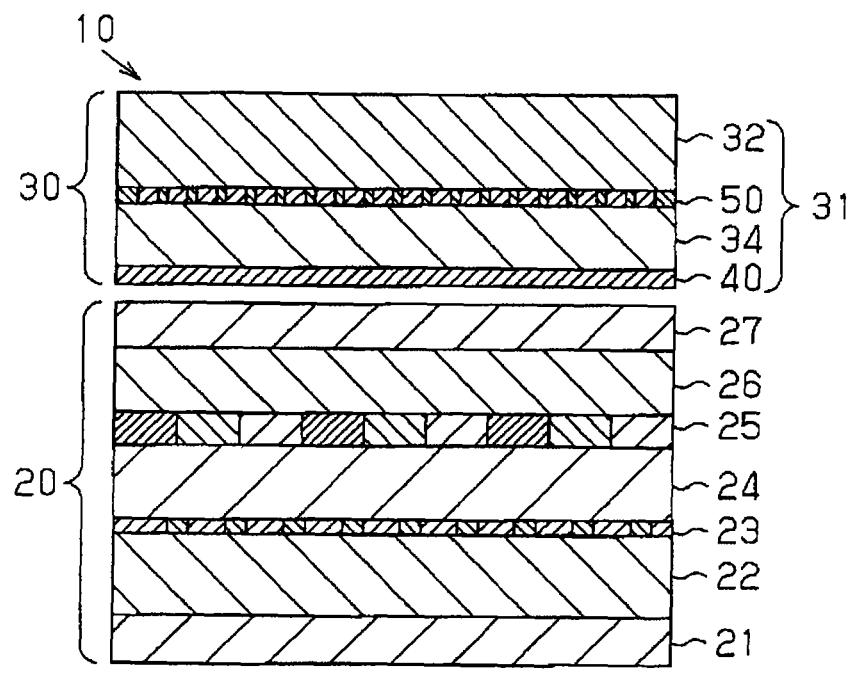
FIG. 11 is a cross-sectional view showing an overall configuration of the display apparatus according to a modification.

According to the first and second embodiments, the drive electrode 40 is formed on the surface of the drive substrate 33 and the sensing electrode 50 is formed on the front surface of the sensing substrate 34. Alternatively, in the manufacturing steps of the touch panel 30, one transparent dielectric layer may be used as a substrate, the drive electrode 40 may be formed on the reverse side of the substrate and the sensing electrode 50 may be formed on the front side of the substrate. For example, as shown in FIG. 11, the sensing electrode 50 may be formed on the front surface of the sensing substrate 34 and the drive electrode 40 may be formed on the reverse surface of the sensing substrate 34.

Figure 12:
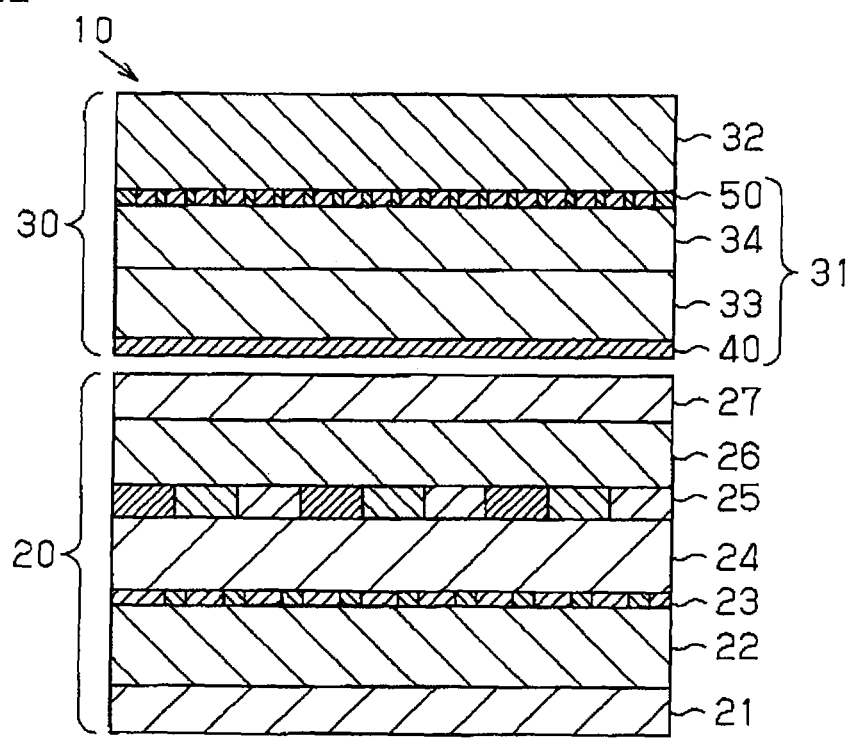
FIG. 12 is a cross-sectional view showing an overall configuration of the display apparatus according to a modification.

In the touch panel 30, the drive electrode 40 and the sensing electrode 50 may be constituted with a transparent dielectric layer which is different from a substrate used in these manufacturing steps therebetween. For example, as shown in FIG. 12, the sensing electrode 50 may be formed on the front surface of the sensing substrate 34, the drive electrode 40 may be formed on the reverse side of the drive substrate 33 and the sensing substrate 34 may be formed on the drive substrate 33 via an adhesive member.

The sensing electrode 50 as a second electrode may be formed on the reverse side of the transparent dielectric layer, and the drive electrode 40 as a first electrode may be formed on the front surface of the transparent dielectric layer. That is, the touch panel 30 may be constituted to have a plurality of first electrodes, on the front surface of the transparent dielectric layer, extended along the first direction and arranged repeatedly along the second direction that crosses the first direction and a plurality of second electrodes, on the reverse surface of the transparent dielectric layer, extended along the second direction and arranged repeatedly along the first direction.

The arrangement of the pixels in the display panel 20 is not limited to a stripe shape, however, a mosaic shape or a delta shape may be used. In other words, a configuration in which a direction where the drive electrode 40 extends is set as a direction where the pixel is arranged and a direction where the sensing electrode 50 extends is set as a direction where the pixel is arranged may be used.

A display element used for the display panel 20 is not limited to a liquid crystal element. However, for example, the display element may be a self-luminous element such as organic EL (electroluminescent) device. In other words, the display panel 20 may have a configuration in which each of the plurality of pixels is divided to form a lattice shape. When the display element has a configuration in which a linear line extended along a direction where the drive electrode 40 extends and a linear line extended along a direction in which the sensing electrode 50 extends cross each other so as to divide each of the plurality of pixels to be in a lattice shape, occurrence of interference fringes is reduced in a display apparatus in which a display panel and a touch panel 30 are stacked.

According to a configuration in which the first electrode or the second electrode are formed by metal that absorbs or reflects visible light, when viewing from the operation surface of the touch panel, a lattice-like pattern in which the plurality of first electrode and the plurality of second electrode orthogonally cross each other may be visually recognized. Also, even in a display panel where touch panels are laminated, a black matrix that divides a plurality of pixels along the X-direction and the Y-direction may be visually recognized as a lattice-like pattern.

In this case, generally, intervals between mutually adjacent first electrodes are different from intervals between mutually adjacent pixels in the Y-direction and also, intervals between mutually adjacent second electrodes are different from intervals between mutually adjacent pixels in the X-direction. As a result, when viewing from the operation panel of the touch panel, interference fringes caused by a mismatch between the lattice-like pattern formed by the first electrode and the second electrode and the lattice-like pattern that divides the pixels is likely to be visually recognized.

The purpose of the technique according to the present disclosure is to provide a touch panel capable of reducing the occurrence of interference fringe and a display apparatus.

As an aspect of a touch panel according to the technique in the present disclosure, a touch panel is disposed on a plurality of pixels arranged along a first direction and a second direction which are two directions that cross each other, the plurality of pixels being formed in a matrix, the touch panel including a transparent dielectric layer; a plurality of first electrodes extended along the first direction and arranged along the second direction on a front surface of the transparent dielectric layer; and a plurality of second electrodes extended along the second direction and arranged along the first direction on a reverse surface of the transparent dielectric layer. The first electrode includes a plurality of first main electrode wirings extended along a direction that crosses the first direction and the second direction, being interrupted in a region between mutually adjacent first electrodes; and a plurality of first sub electrode wirings that respectively connects mutually different plurality of first main electrode wirings. Also, the second electrode includes a plurality of second main electrode wirings extended along a direction that crosses the first direction and the second direction, being interrupted in a region between mutually adjacent second electrodes; and a plurality of second sub electrode wirings that respectively connects mutually different plurality of second main electrode wirings. The first main electrode wiring crosses the second main electrode wiring when viewing from the front surface of the dielectric layer.

As an aspect of a display apparatus according to the technique in the present disclosure, a display apparatus includes a display panel in which pixels are arranged along a first direction and a second direction which are two directions that cross each other and a touch panel stacked on the display panel. The touch panel includes a transparent dielectric layer; a plurality of first electrodes extended along the first direction and arranged along the second direction on a front surface of the transparent dielectric layer; and a plurality of second electrodes extended along the second direction and arranged repeatedly along the first direction on a reverse surface of the transparent dielectric layer. The first electrode includes a plurality of first main electrode wirings extended along a direction that crosses the first direction and the second direction, being interrupted in a region between mutually adjacent first electrodes; and a plurality of first sub electrode wirings that connects mutually different plurality of first main electrode wirings. Also, the second electrode includes a plurality of second main electrode wirings extended along a direction that crosses the first direction and the second direction, being interrupted in a region between mutually adjacent second electrodes; and a plurality of second sub electrode wirings that connects mutually different plurality of second main electrode wirings. The first main electrode wiring crosses the second main electrode wiring when viewing from the front surface of the dielectric layer.

According to an aspect of the technique in the present disclosure, each of the plurality of first main electrode wirings and each of the plurality of second main electrode wirings extend along a respective first direction which is a direction where the first electrode extends and a direction crossing a second direction where the second electrode extends. A quadrangular pattern formed by two mutually adjacent first main electrode wirings and two mutually adjacent second main electrode wirings is arranged along the first direction and a direction that crosses the second direction when viewing from the front surface of the transparent dielectric layer. Therefore, when the touch panel is stacked on the plurality of pixels which are arranged in a matrix, viewing from the front surface of the transparent dielectric layer, directions in which the plurality of pixels are arranged cross the directions where the above-described quadrangular pattern are arranged. As a result, the pattern formed by the first electrode and the second electrode includes a plurality of quadrangular patterns that obliquely cross a lattice-like pattern that divides each of the plurality of pixels. Accordingly, interference fringes caused by the plurality of electrode wirings included in the touch panel can be avoided.

As an another aspect of a touch panel according to the technique in the present disclosure, when viewing from the front surface of the transparent dielectric layer, the first sub electrode wiring is arranged to be extended along the second main electrode wiring and arranged at a position in which two second main electrode wirings are connected in a region between mutually adjacent second electrodes, the two second main electrode wirings being interrupted in a direction where the second main electrode wiring extends. The second sub electrode wiring is arranged to be extended along the first main electrode wiring and arranged at a position in which two first main electrode wirings are connected in a region between mutually adjacent first electrodes, the two first main electrode wirings being interrupted in a direction where the first main electrode wiring extends.

According to another aspect of the touch panel of the technique in the present disclosure, when viewing from the front surface of the transparent dielectric layer, an interrupted portion of the second main electrode wiring is supplemented by an image of the first sub electrode wiring and an interrupted portion of the first main electrode wiring is supplemented by an image of the second sub electrode wiring. Hence, an image that constitutes a linear line is formed by two mutually different second main electrode wirings arranged along a direction where the second main electrode wiring extends and the first sub electrode wiring arranged between these two second main electrode wirings. Also, an image that constitutes a linear line is formed by two mutually different first main electrode wirings arranged along a direction where the first main electrode wiring extends and the second sub electrode wiring arranged between these two first main electrode wirings. Accordingly, it is avoided that appearance of different images between a gap between two mutually adjacent electrodes and two mutually adjacent electrodes to be visually recognized from the front surface of the transparent dielectric layer.

As an another aspect of a touch panel according to the technique in the present disclosure, when viewing from the front surface of the transparent dielectric layer, the first electrode and the second electrode form a lattice-like pattern in which a plurality of quadrangles are successively arranged.

According to an another aspect of a touch panel of the technique in the present disclosure, when viewing from the front surface of the transparent dielectric layer, an image formed by the first electrode and the second electrode is a lattice-like pattern in which a plurality of quadrangles are successively arranged. Therefore, compared to a case where a pattern where the lattice has missing parts is visually recognized as an image, homogeneity of an image to be visually recognized is enhanced. As a result, when viewing from the front surface of the transparent dielectric layer, occurrence of nonuniformity on the image formed by the first electrode and the second electrode can be avoided.

As an another aspect of a touch panel according to the technique in the present disclosure, the first direction and the second direction cross each other; a direction where the first main electrode wiring extends and a direction where the second main electrode wiring extends cross each other; a direction where the first main electrode wiring extends and a direction where the first sub electrode wiring extends cross each other; and a direction where the second main electrode wiring extends and a direction where the second sub electrode wiring extends cross each other. The lattice like-pattern is constituted by a rectangle arranged in a matrix.

According to an another aspect of a touch panel of the technique in the present disclosure, when viewing from the front surface of the transparent dielectric layer, an image formed by the first electrode and the second electrode is a lattice-like pattern including a plurality of rectangles arranged in a matrix. Therefore, compared to a configuration in which an image formed by a first electrode and a second electrode is a pattern constituted by a plurality of quadrangles and an interior angle in each of the plurality of quadrangles are different from each other, occurrence of undulation on the image formed by the first electrode and the second electrode can be avoided.

As another aspect of a touch panel according to the technique in the present disclosure, the touch panel further includes an auxiliary electrode wiring in which, on a front surface of the transparent dielectric layer, the auxiliary electrode wiring is formed in a region between mutually adjacent first electrodes and intermittently connects, along the first main electrode wiring, the two first main electrode wirings which are interrupted in a direction where the first main electrode wiring extends.

According to an another aspect of a touch panel of the technique in the present disclosure, when viewing from the front surface of the transparent dielectric layer, the auxiliary electrode wiring formed on the front surface of the transparent dielectric layer intermittently connects the two first main electrode wirings which are interrupted and overlaps the image of the second sub electrode wiring that connects the two first main electrode wirings which are interrupted. Since the image of the second sub electrode wiring to be visually recognized from the front surface of the transparent dielectric layer is formed by light transmitted through the transparent dielectric layer, the lower the transmittance of the transparent dielectric layer, the more the image of the second sub electrode wiring becomes indistinct. In this respect, according to the configuration in which the above-described auxiliary electrode wiring is formed, since the image of the second sub electrode wiring and the auxiliary electrode wiring are overlapped with each other, the auxiliary electrode wiring is visually recognized as a part of image that connects two first main electrode wirings which are interrupted. Therefore, when viewing from the front surface of the display apparatus, occurrence of nonuniformity on the image formed by the first electrode and the second electrode can be further avoided.

According to the technique of the present disclosure, interference fringes caused by a plurality of electrode wirings can be reduced.

DESCRIPTION OF REFERENCE NUMERALS

10: display apparatus
20: display panel
21: lower deflection plate
22: TFT substrate
23: TFT layer
24: liquid crystal layer
25: color filter layer
26: color filter substrate
27: upper deflection plate
28: black matrix
29: colored layer
30: touch panel
31: sensor layer
32: cover layer
33: drive substrate
34: sensing substrate
40: drive electrode
41: second main electrode wiring 42: second sub electrode wiring
43, 53: terminal portion
50: sensing electrode
51: first main electrode wiring
52: first sub electrode wiring
54: auxiliary electrode wiring Obviously, numerous modifications and variations of the present invention are possible in light of the above teachings. It is therefore to be understood that within the scope of the appended claims, the invention may be practiced otherwise than as specifically described herein.

What is claimed is:

1. A touch panel, comprising:
a transparent dielectric layer having a front surface and a reverse surface opposite to the front surface;
a plurality of first electrodes each extended in a first direction of a pixel matrix and formed on the front surface of the transparent dielectric layer such that the first electrodes are arranged in a second direction of the pixel matrix which crosses the first direction; and
a plurality of second electrodes each extended in the second direction and formed on the reverse surface of the transparent dielectric layer such that the second electrodes are arranged in the first direction,
wherein each of the first electrodes are constituted by a plurality of first main electrode wirings and a plurality of first sub electrode wirings that extend along mutually different directions, the first main electrode wirings are extended in a direction crossing the first and second directions, the first main electrode wirings have at least one end portion that extends towards a disconnected region between adjacent first electrodes such that a linear line connects said at least one end portions of the first main electrodes, the first sub electrode wirings connect the first main electrode wirings via end portions of the first sub electrode wirings, the first sub electrode wirings having end portions connected to the same first main electrode wiring are connected to different portions of the same first main electrode wiring, a length of each first main electrode wiring is greater than a length of each first sub electrode wiring, and a distance from one end of each first main electrode wiring to the closest first sub electrode wiring, that is connected to said first main electrode wiring, is different from the other end of said fist main electrode wiring to another closest first sub electrode wiring, that is also connected to said first main electrode wiring,
each of the second electrodes are constituted by a plurality of second main electrode wirings and a plurality of second sub electrode wirings that extend along mutually different directions, the second main electrode wirings are extended in a direction crossing the first and second directions, the second main electrode wirings have at least one end portion that extends towards a disconnected region between adjacent second electrodes such that a linear line connects said at least one end portions of the second main electrodes, the second sub electrode wirings connect the second main electrode wirings via end portions of the second sub electrode wirings, a length of each second main electrode wiring is greater than a length of each second sub electrode wiring, and a distance from one end of each second main electrode wiring to the closest second sub electrode wiring, that is connected to said second main electrode wiring, is different from the other end of said second main electrode wiring to another closest second sub electrode wiring, that is also connected to said second main electrode wiring,
the first and second main electrode wirings are formed such that the first main electrode wirings cross the second main electrode wirings when viewed from the front surface of the dielectric layer,
a spacing between the plurality of first main electrode wirings is smaller than a spacing between the plurality of first sub electrode wirings, and
when viewed from the front surface of the transparent dielectric layer, the first sub electrode wirings extend in a direction along the second main electrode wirings and are positioned in the disconnected region of the second main electrode wirings to connect two adjacent second electrodes, and the second sub electrode wirings extend in a direction along the first main electrode wirings and are positioned in the disconnected region of the first main electrode wirings to connect two adjacent first electrodes.

2. The touch panel according to claim 1, wherein the transparent dielectric layer is a first transparent dielectric layer, the touch panel further comprises a second transparent dielectric layer, and the second electrodes are formed on a front surface of the second transparent dielectric layer.

3. The touch panel according to claim 1, wherein the transparent dielectric layer includes a plurality of transparent dielectric layers.

4. The touch panel according to claim 1, wherein, when viewed from the front surface of the transparent dielectric layer, the first electrodes and the second electrodes form a lattice-like pattern including a plurality of quadrangles successively formed.

5. The touch panel according to claim1, further comprising:
a plurality of auxiliary electrode wirings formed on the front surface of the transparent dielectric layer,
wherein the auxiliary electrode wirings are discontinuously formed in the disconnected region of the first main electrode wirings along a line connecting the first main electrode wirings of two adjacent first electrodes.

6. The touch panel according to claim 1, wherein
the plurality of first electrodes and the plurality of second electrodes are arranged in a bar pattern,
the first main electrode wirings of each of the plurality of first electrodes are parallel to each other and have a constant width, and
the second main electrode wirings of each of the plurality of second electrodes are parallel to each other and have a constant width.

7. The touch panel according to claim 1, wherein
the first main electrode wirings and the first sub electrode wirings are not formed in the disconnected regions between the adjacent first electrodes, and
the second main electrode wirings and the second sub electrode wirings are not formed in the disconnected regions between the adjacent second electrodes.

8. The touch panel according to claim 1, wherein
each of the first sub electrode wiring connects a number of the first main electrode wirings that is less than a total number of the first main electrode wirings in the respective first electrode, and
each of the second sub electrode wirings connects a number of the second main electrode wirings that is less than the total number of second main electrode wirings in the respective second electrode.

9. A touch panel, comprising:
a transparent dielectric layer having a front surface and a reverse surface opposite to the front surface;
a plurality of first electrodes each extended in a first direction of a pixel matrix and formed on the front surface of the transparent dielectric layer such that the first electrodes are arranged in a second direction of the pixel matrix which crosses the first direction, and
a plurality of second electrodes each extended in the second direction and formed on the reverse surface of the transparent dielectric layer such that the second electrodes are arranged in the first direction,
wherein each of the first electrodes are constituted by a plurality of first main electrode wirings and a plurality of first sub electrode wirings that extend along mutually different directions, the first main electrode wirings are extended in a direction crossing the first and second directions, the first main electrode wirings have at least one end portion that extends towards a disconnected region between adjacent first electrodes such that a linear line connects said at least one end portions of the first main electrodes, the first sub electrode wirings connect the first main electrode wirings via end portions of the first sub electrode wirings, the first sub electrode wirings having end portions connected to the same first main electrode wiring are connected to different portions of the same first main electrode wiring, a length of each first main electrode wiring is greater than a length of each first sub electrode wiring, and a distance from one end of each first main electrode wiring to the closest first sub electrode wiring, that is connected to said first main electrode wiring, is different from the other end of said fist main electrode wiring to another closest first sub electrode wiring, that is also connected to said first main electrode wiring,
each of the second electrodes are constituted by a plurality of second main electrode wirings and a plurality of second sub electrode wirings that extend along mutually different directions, the second main electrode wirings are extended in a direction crossing the first and second directions, the second main electrode wirings have at least one end portion that extends towards a disconnected region between adjacent second electrodes such that a linear line connects said at least one end portions of the second main electrodes, the second sub electrode wirings connect the second main electrode wirings via end portions of the second sub electrode wirings, a length of each second main electrode wiring is greater than a length of each second sub electrode wiring, and a distance from one end of each second main electrode wiring to the closest second sub electrode wiring, that is connected to said second main electrode wiring, is different from the other end of said second main electrode wiring to another closest second sub electrode wiring, that is also connected to said second main electrode wiring,
the first and second main electrode wirings are formed such that the first main electrode wirings cross the second main electrode wirings when viewed from the front surface of the dielectric layer,
a spacing between the plurality of first main electrode wirings is smaller than a spacing between the plurality of first sub electrode wirings,
when viewed from the front surface of the transparent dielectric layer, the first electrodes and the second electrodes form a lattice-like pattern including a plurality of quadrangles successively formed,
the first direction and the second direction cross each other,
a direction where the first main electrode wirings extend and a direction where the second main electrode wirings extend cross each other,
the direction where the first main electrode wirings extend and a direction where the first sub electrode wirings extend cross each other,
the direction where the second main electrode wirings extend and a direction where the second sub electrode wirings extend cross each other, and
the lattice like-pattern includes a plurality of rectangles successively formed in a matrix.

10. A display apparatus, comprising:
a display panel having a plurality of pixels formed in a first direction and a second direction which cross each other; and
a touch panel stacked on the display panel, the touch panel including a transparent dielectric layer having a front surface and a reverse surface opposite to the front surface;
a plurality of first electrodes each extended in a third direction of a pixel matrix and formed on the front surface of the transparent dielectric layer such that the first electrodes are arranged in a fourth direction of the pixel matrix which crosses the third direction; and
a plurality of second electrodes each extended in the fourth direction and formed on the reverse surface of the transparent dielectric layer such that the second electrodes are arranged in the third direction,
wherein each of the first electrodes are constituted by a plurality of first main electrode wirings and a plurality of first sub electrode wirings that extend along mutually different directions, the first main electrode wirings are extended in a direction crossing the third and fourth directions, the first main electrode wirings have at least one end portion that extends towards a disconnected region between adjacent first electrodes such that a linear line connects said at least one end portions of the first main electrodes, the first sub electrode wirings connect the first main electrode wirings via end portions of the first sub electrode wirings, the first sub electrode wirings having end portions connected to the same first main electrode wiring are connected to different portions of the same first main electrode wiring, a length of each first main electrode wiring is greater than a length of each first sub electrode wiring, and a distance from one end of each first main electrode wiring to the closest first sub electrode wiring, that is connected to said first main electrode wiring, is different from the other end of said fist main electrode wiring to another closest first sub electrode wiring, that is also connected to said first main electrode wiring,
each of the second electrodes are constituted by a plurality of second main electrode wirings and a plurality of second sub electrode wirings that extend along mutually different directions, the second main electrode wirings are extended in a direction crossing the third and fourth directions, the second main electrode wirings have at least one end portion that extends towards a disconnected region between adjacent second electrodes such that a linear line connects said at least one end portions of the second main electrodes, the second sub electrode wirings connect the second main electrode wirings via end portions of the second sub electrode wirings, a length of each second main electrode wiring is greater than a length of each second sub electrode wiring, and a distance from one end of each second main electrode wiring to the closest second sub electrode wiring, that is connected to said second main electrode wiring, is different from the other end of said second main electrode wiring to another closest second sub electrode wiring, that is also connected to said second main electrode wiring, the first and second main electrode wirings are formed such that the first main electrode wirings cross the second main electrode wirings when viewed from the front surface of the dielectric layer, a spacing between the plurality of first main electrode wirings is smaller than a spacing between the plurality of first sub electrode wirings, and when viewed from the front surface of the transparent dielectric layer, the first sub electrode wirings extend in a direction along the second main electrode wirings and are positioned in the disconnected region of the second main electrode wirings to connect two adjacent second electrodes, and the second sub electrode wirings extend in a direction along the first main electrode wirings and are positioned in the disconnected region of the first main electrode wirings to connect two adjacent first electrodes when viewed from the front surface of the transparent dielectric layer.

11. The display apparatus according to claim 10, wherein the transparent dielectric layer is a first transparent dielectric layer, the touch panel further comprises a second transparent dielectric layer, and the second electrodes are formed on a front surface of the second transparent dielectric layer.

12. The display apparatus according to claim 11, wherein the transparent dielectric layer includes a plurality of transparent dielectric layers.

13. The display apparatus according to claim 10, wherein, when viewed from the front surface of the transparent dielectric layer, the first electrode and the second electrode form a lattice-like pattern including a plurality of quadrangles successively formed.

14. The display apparatus according to claim 10, further comprising:
a plurality of auxiliary electrode wirings formed on the front surface of the transparent dielectric layer,
wherein the auxiliary electrode wirings are discontinuously formed in the disconnected region of the first main electrode wirings along a line connecting the first main electrode wirings of two adjacent first electrodes.

15. The display apparatus according to claim 10, wherein the plurality of first electrodes and the plurality of second electrodes are arranged in a bar pattern,
the first main electrode wirings of each of the plurality of first electrodes are parallel to each other and have a constant width, and
the second main electrode wirings of each of the plurality of second electrodes are parallel to each other and have a constant width.

16. The display apparatus according to claim 10, wherein the first main electrode wirings and the first sub electrode wirings are not formed in the disconnected regions between the adjacent first electrodes, and
the second main electrode wirings and the second sub electrode wirings are not formed in the disconnected regions between the adjacent second electrodes.

17. The display apparatus according to claim 10, wherein each of the first sub electrode wirings connects a number of the first main electrode wirings that is less than a total number of the first main electrode wirings in the respective first electrode, and each of the second sub electrode wirings connects a number of the second main electrode wirings that is less than the total number of second main electrode wirings in the respective second electrode.

18. A display apparatus, comprising:
a display panel having a plurality of pixels formed in a first direction and a second direction which cross each other; and
a touch panel stacked on the display panel, the touch panel including
a transparent dielectric layer having a front surface and a reverse surface opposite to the front surface,
a plurality of first electrodes each extended in a third direction of a pixel matrix and formed on the front surface of the transparent dielectric layer such that the first electrodes are arranged in a fourth direction of the pixel matrix which crosses the third direction; and
a plurality of second electrodes each extended in the fourth direction and formed on the reverse surface of the transparent dielectric layer such that the second electrodes are arranged in the third direction,
wherein each of the first electrodes are constituted by a plurality of first main electrode wirings and a plurality of first sub electrode wirings that extend along mutually different directions, the first main electrode wirings are extended in a direction crossing the third and fourth directions, the first main electrode wirings have at least one end portion that extends towards a disconnected region between adjacent first electrodes such that a linear line connects said at least one end portions of the first main electrodes, the first sub electrode wirings connect the first main electrode wirings via end portions of the first sub electrode wirings, the first sub electrode wirings having end portions connected to the same first main electrode wiring are connected to different portions of the same first main electrode wiring, a length of each first main electrode wiring is greater than a length of each first sub electrode wiring, and a distance from one end of each first main electrode wiring to the closest first sub electrode wiring, that is connected to said first main electrode wiring, is different from the other end of said fist main electrode wiring to another closest first sub electrode wiring, that is also connected to said first main electrode wiring, each of the second electrodes are constituted by a plurality of second main electrode wirings and a plurality of second sub electrode wirings that extend along mutually different directions, the second main electrode wirings are extended in a direction crossing the third and fourth directions, the second main electrode wirings have at least one end portion that extends towards a disconnected region between adjacent second electrodes such that a linear line connects said at least one end portions of the second main electrodes, the second sub electrode wirings connect the second main electrode wirings via end portions of the second sub electrode wirings, a length of each second main electrode wiring is greater than a length of each second sub electrode wiring, and a distance from one end of each second main electrode wiring to the closest second sub electrode wiring, that is connected to said second main electrode wiring, is different from the other end of said second main electrode wiring to another closest second sub electrode wiring, that is also connected to said second main electrode wiring, the first and second main electrode wirings are formed such that the first main electrode wirings cross the second main electrode wirings when viewed from the front surface of the dielectric layer, a spacing between the plurality of first main electrode wirings is smaller than a spacing between the plurality of first sub electrode wirings, when viewed from the front surface of the transparent dielectric layer, the first electrode and the second electrode form a lattice-like pattern including a plurality of quadrangles successively formed, the first direction and the second direction cross each other, a direction where the first main electrode wirings extend and a direction where the second main electrode wirings extend cross each other, the direction where the first main electrode wirings extend and a direction where the first sub electrode wirings extend cross each other, the direction where the second main electrode wirings extend and a direction where the second sub electrode wirings extend cross each other, and the lattice like-pattern includes a plurality of rectangles successively formed in a matrix.

* * * * *